United States Patent [19]

Brewer

[11] Patent Number: 4,869,158
[45] Date of Patent: Sep. 26, 1989

[54] ELEVATED BEVERAGE BREWER WITH SIDE DISCHARGE

[75] Inventor: Alan W. Brewer, Divernon, Ill.
[73] Assignee: Bunn-O-Matic Corp., Springfield, Ill.
[21] Appl. No.: 309,119
[22] Filed: Feb. 13, 1989
[51] Int. Cl.[4] ............................................. A47J 31/00
[52] U.S. Cl. ........................................ 99/279; 99/295
[58] Field of Search ,................ 99/279, 284, 295, 290, 99/291, 299, 300, 302 R, 304, 306; 426/433

[56] References Cited

U.S. PATENT DOCUMENTS

| | | | |
|---|---|---|---|
| 4,309,939 | 1/1982 | Stover | 99/295 |
| 4,621,571 | 11/1986 | Roberts | 99/280 |
| 4,773,313 | 9/1988 | Anson | 99/295 |
| 4,809,594 | 3/1989 | Vitous | 99/280 |

*Primary Examiner*—Robert W. Jenkins

[57] ABSTRACT

Beverage brewing apparatus capable of discharging brewed beverage either into a carafe disposed directly beneath the brewing funnel or into a container substantially taller than a carafe and too tall to fit directly under the funnel. The apparatus comprises a beverage brewer of the type in which brewed beverage discharges from a brewing funnel into a carafe supported directly below and a kit for converting the beverage brewer so as to permit brewed beverage to discharge into either a carafe or a container, such as an air pot which is too tall to fit directly under the funnel. The kit comprises legs to support the beverage brewer in an elevated position, an elongated spigot, and means for readily attaching and detaching the spigot to a discharge fitting of the brewing funnel. The spigot extends laterally to one side of the brewer so as to discharge into a tall container disposed at one side of the brewer.

7 Claims, 1 Drawing Sheet

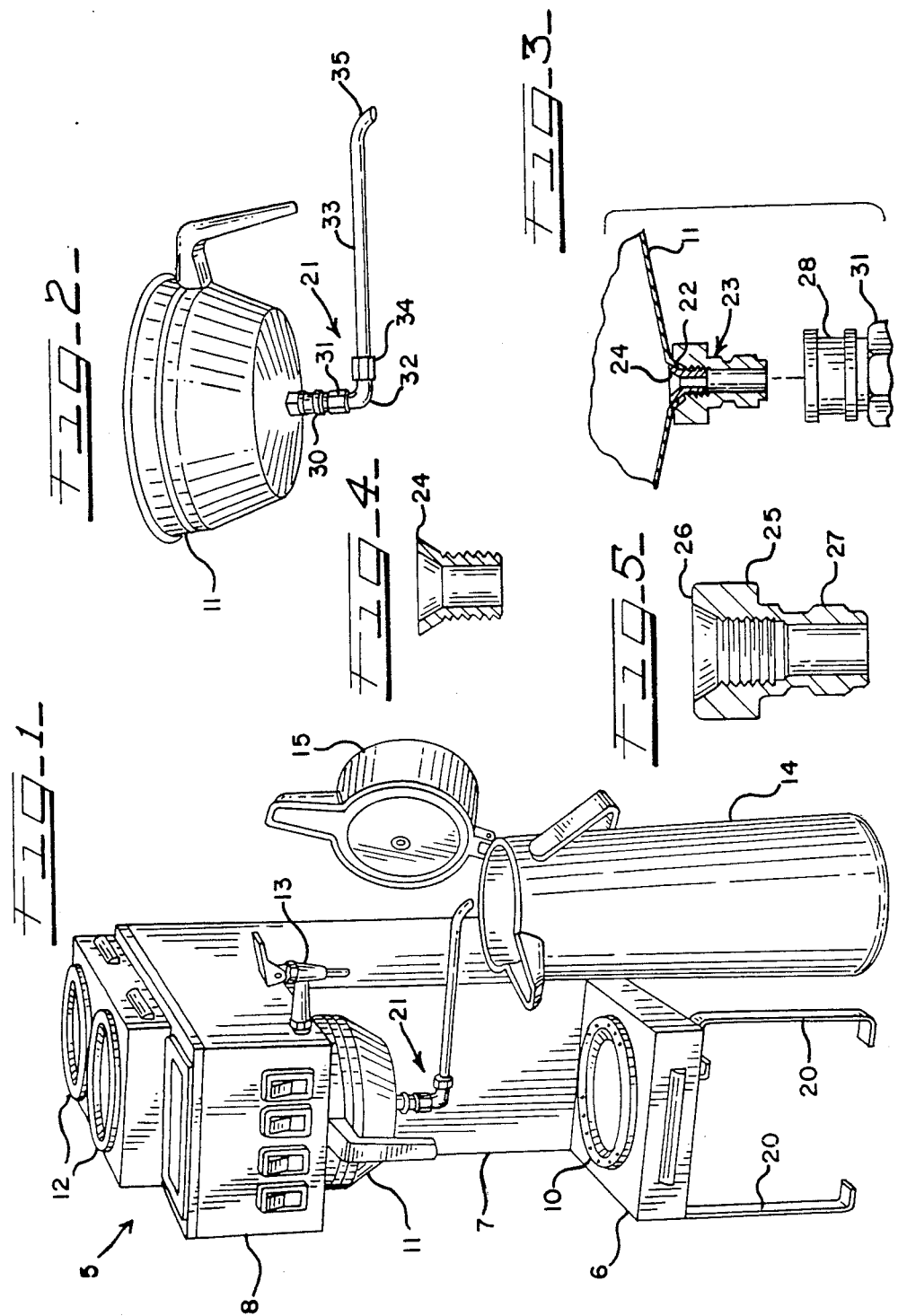

ELEVATED BEVERAGE BREWER WITH SIDE DISCHARGE

SPECIFICATION

This invention relates generally to beverage (e.g. coffee and tea) brewing apparatus convertible from a brewer discharging from a brewing funnel into a carafe disposed directly beneath the funnel to a brewer also discharging from the funnel through a removable spigot into a container disposed to one side of the brewer and too tall to fit on the brewer directly underneath the brewing funnel. The invention further relates to a kit for converting a brewer which is not capable of accepting a tall container underneath the brewing funnel to one which is capable of accepting and discharging brewed beverage into such a tall container.

Beverage brewers are well known and widely available which spray hot water onto ground coffee or tea leaves retained in a paper filter inserted as a liner in a brewing funnel with the brewed coffee or tea discharging from the brewing funnel into a carafe disposed directly beneath the funnel outlet, usually located in the center of the funnel bottom. Beverage brewing apparatus of this type is disclosed for example in the following U.S. Pat. Nos. to: Martin 3,385,201 dated May 28, 1968; Daugherty 4,413,552 dated Nov. 8, 1983; Stover 4,464,981 dated Aug. 14, 1984; and, Stover 4,531,046 dated July 23, 1985.

For quite some time so-called "air pot" beverage containers have been popular being of the type from which the beverage contents can be dispensed by a bellows-type pump. Such air pot beverage containers are normally too tall to fit directly underneath the brewing funnels in beverage brewers of the above type. This makes it necessary to first collect the brewed coffee or tea in a carafe disposed underneath the brewing funnel and then empty the same into the air pot.

In accordance with the present invention, a kit is provided whereby a beverage brewer of the above-mentioned type may be converted into one capable of discharging brewed beverage directly from a brewing funnel into a air pot container or other relatively tall container which is too tall to fit directly underneath the brewing funnel.

The object of the invention, generally stated, is the provision of means in the form of a kit whereby a beverage brewer which normally discharges brewed coffee or tea into a carafe setting directly underneath a brewing funnel may be converted into a unit whereby the brewed coffee or tea can be discharged directly from the brewing funnel into a container which is too tall to fit directly underneath the brewing funnel.

Certain additional and specific objects of the invention will become apparent to those skilled in the art in view of the following detailed description of a presently preferred embodiment of the invention taken in connection with the accompanying drawings, wherein:

FIG. 1 is a perspective view of a beverage brewer that has been converted so as to be capable of discharging beverage from a brewing funnel directly into an air pot container;

FIG. 2 is a perspective view from the underside showing the brewing funnel and its attached discharge spigot removed from the apparatus shown in FIG. 1;

FIG. 3 is an exploded fragmentary detail view on enlarged scale showing the releasable connection of the spigot of FIGS. 1 and 2 to the outlet fitting of the brewing funnel;

FIG. 4 is a vertical sectional view on enlarged scale of a brewing funnel tip insert which forms parts of the male outlet fitting shown in FIG. 3; and FIG. 5 is a sectional view of the female portion of the releasable fitting on the spigot as shown on FIG. 3.

Referring to FIG. 1, a beverage brewer is indicated generally at 5 therein which corresponds to the beverage brewer shown and described in the above-mentioned Pat. No. 4,464,981, the disclosure and contents of which are incorporated by reference herein. The body of the brewer 5 comprises a base 6, a trunk 7, and a superstructure 8. A portion of the superstructure 8 overhangs a portion of the base 6 which incorporates a circular warmer 10 on which a carafe (not shown) may be supported directly beneath a funnel 11 supported in known manner underneath the overhang portion of the superstructure 8. The brewer 5 is provided with two top warmers 12—12 and a hot water spigot 13 on one side. Also in FIG. 1 an air pot type container 14 of known type is shown having hinged to the top thereof a cover which incorporates a manual air pump. It will be seen that the container 14 is too tall to rest on the bottom warmer 10 and fit directly underneath the funnel 11. The present invention provides a kit which may be utilized to convert the beverage brewer 5 so that brewed beverage can discharge directly from the brewing funnel 11 into the too-tall container 14.

The kit comprises four legs 20—20 and a spigot assembly indicated generally at 21. The legs are secured in known manner to the underside of the base 6 and are of such length that they elevate the brewer 5 to a position where the spigot 21 will discharge into the open container or reservoir 14 as shown in FIG. 1. It will be understood that various types of the legs 20 may be used and if desired they can be extensible and adjustable.

The bottom of the funnel 11 is dished to a center outlet opening or drain defined by inverted frusto-conical lip 22 (FIG. 3). A male outlet fitting indicated generally at 23 in FIG. 3 is secured to the underside of the funnel 11. The male fitting 23 comprises an exteriorly threaded insert 24 which sets in the lip 22 and projects therefrom. A male fitting 25 has an integrally formed interiorly threaded hex nut portion 26 which screws onto the protruding threaded portion of the insert 24 as shown in FIG. 3. The lower end of the male fitting 25 has a circumferential land 27 which is adapted t be received into the female fitting portion 28 of a female spring-loaded connector 30 of known commercial type. For example, the releasable female fitting 28 may be a Hansen Series ST Socket No. LL1-S11.

The outer body of the female fitting 28 has a hex nut 31 integrally formed thereon which is threaded onto one leg of an elbow 32. The flared end of a spigot tube 33 is connected to the horizontal leg of the elbow 32 by a hex nut 34. The outlet end of the spigot tube 33 is tilted down as indicated at 35 so that beverage discharges downwardly into the receptacle 14.

The spigot assembly 21 may be readily installed on the funnel 11. First, the retaining nut (not shown) which ordinarily is screwed onto the insert 24 from the outside is removed and replaced by the male fitting 25. The spring-loaded female portion 28 of the female fitting is retracted and fitted over the bottom end of the male fitting 25 and then released. The female fitting 28 upon release provides a spring-loaded fluid-tight connection with the male fitting.

With the spigot assembly 21 attached to the funnel 11, the funnel may be used in the conventional manner in the brewer 5. First, a paper filter is inserted in the brewing funnel 11 and then the charge of ground coffee or tea is placed on the filter paper and the funnel inserted beneath the overhang portion of the superstructure 8. The female fitting 28 is rotatable relative to the male fitting 25 and this permits the spigot tube 33 to be swung or pivoted in a generally horizontal plane so that the discharge end 35 is located over the mouth of the reservoir 14. The operator now proceeds to brew coffee or tea in the known manner by having the desired quantity of cold water introduced into the brewer so as to displace a corresponding quantity or volume of hot water which is sprayed over the ground coffee or dry tea contained in the brewing funnel 11. As the brewed coffee or tea discharges from the funnel 11, it will be seen that it flows out through the spigot assembly 21 and into the reservoir 14. Desirably, the spigot tube 33 is tilted or inclined downwardly at a slight angle s as to assist in the draining action.

What is claimed is:

1. Beverage brewing apparatus capable of discharging brewed beverage from a brewing funnel either into a carafe disposed underneath the brewing funnel or into a container too tall to be disposed directly underneath the brewing funnel, comprising:

a brewing funnel having a downwardly projecting outlet fitting;

a spigot having an inlet end removably attached to said funnel outlet fitting, an outlet end, and a laterally extending elongated tube interconnecting said inlet and outlet ends;

a beverage brewer having a body comprising a base including a carafe support portion, a trunk extending upwardly from said base, a superstructure on said trunk having a portion overhanging said carafe support portion, and means on said overhanging portion for removably supporting said brewing funnel thereunderneath; and, leg means removably attached to said base for supporting said beverage brewer body at an elevation whereat a container too tall to fit on said carafe support portion and underneath said brewing funnel will fit underneath said spigot outlet end.

2. In the beverage brewing apparatus of claim 1, said brewing funnel outlet fitting being removably attached to said brewing funnel.

3. In the beverage brewing apparatus of claim 1, said spigot being swingable in a generally horizontal plane.

4. In the beverage brewing apparatus of claim 1, said funnel outlet fitting being a male fitting and said spigot inlet end having a female fitting removably attached to said male outlet fitting.

5. A kit for converting a beverage brewer which discharges brewed beverage from a brewing funnel into a carafe supported directly beneath the funnel discharge fitting to a brewer capable of discharging brewed beverage from the brewing funnel into a container too tall to fit directly underneath the funnel, comprising:

legs removably attachable to said brewer for supporting it in an elevated position and spigot means removably attachable to said funnel discharge fitting, said spigot means having a tubular portion which extends laterally to one side of said brewer in its said elevated position.

6. The kit called for in claim 5, wherein said spigot means comprises a male discharge fitting removably attachable to said funnel, and a female inlet fitting mounted on one end of said spigot tubular portion and releasably attachable to said male discharge fitting.

7. The kit called for in claim 6, wherein said female inlet fitting is rotatable relative to said male fitting when attached thereto.

* * * * *